United States Patent [19]

Gullberg et al.

[11] Patent Number: 4,633,398

[45] Date of Patent: Dec. 30, 1986

[54] ATTENUATION COMPENSATED EMISSION RECONSTRUCTION WITH SIMULTANEOUS ATTENUATION FACTOR EVALUATION

[75] Inventors: Grant T. Gullberg, Waukesha; Norbert J. Pelc, Wauwatosa, both of Wis.

[73] Assignee: General Electric Company, Waukesha, Wis.

[21] Appl. No.: 558,922

[22] Filed: Dec. 7, 1983

[51] Int. Cl.$^4$ .............................................. G06F 15/62
[52] U.S. Cl. ..................................... 364/414; 378/901
[58] Field of Search ......................... 364/414; 378/901

[56] References Cited

PUBLICATIONS

Gullberg, G. T. "The Attenuated Radon Transform Theory and Application in Medicine and Biology", Ph. D. Thesis, University of California, Berkeley, Jun. 1979.
Gullberg, G. T. et al. "The Use of Filtering Methods to Compensate for Constant Attenuation in Single-Photon Emission Computed Tomography", IEEE Transactions on Biomedical Engineering, vol. BME-28, No. 2, Feb. 1981, 142-157.
Budinger, T. F. et al. "Image Reconstruction from Projections. Implementation and Applications", Reprint from Topics in Applied Physics, vol. 32, Springer-Verlag; Berlin, Germany, 1979, 147-246.

Primary Examiner—Jerry Smith
Assistant Examiner—Clark A. Jablon
Attorney, Agent, or Firm—Leydig, Voit & Mayer

[57] ABSTRACT

Method and apparatus for quickly and efficiently producing ECT (emission computed tomography) images corrected at least in part for attenuation in which a plurality of stored attenuation coefficients are used directly in the projection and back projection operations which produce the ECT image. The evaluation of attentuation factors as needed during the course of projection and back projection avoids the need for precalculation and storage of attenuation factors, thus achieving the reasonably fast reconstruction times needed for efficient diagnostic imaging.

10 Claims, 4 Drawing Figures

ATTENUATION COMPENSATED EMISSION RECONSTRUCTION WITH SIMULTANEOUS ATTENUATION FACTOR EVALUATION

This invention relates to emission computed tomography, ECT, and more particularly to attenuation compensation in ECT.

Computed tomography embraces the fields of transmission computed tomography and emission computed tomography. In transmission computed tomography, a source of x-rays and a detector array having a fixed geometric relationship are used to produce a set of projections for reconstruction. Both the source position and intensity are known, and any of a variety of reconstruction algorithms can be used to reconstruct the attenuation coefficients of a body which was scanned to produce the projections.

In emission computed tomography, the problem is more complex in that the source intensity, the source position, and the attenuation characteristics are all unknown. More particularly, in ECT injected or inhaled compounds labeled with radioactive atoms tend to differentially concentrate in particular regions of the body, and the problem is to reconstruct the intensity and location of those concentrations based on projections taken around the body. The attenuation characteristics of the body obviously affect the projections, and since it is desired to quantitatively define the emission sources, the attenuation characteristics must be taken into account for accurate reconstructions.

The problem has been recognized and has been discussed in the literature: See for example "The Attenuated Radon Transform: Theory and Application in Medicine and Biology", Ph.D. thesis by Grant Gullberg, Lawrence Berkeley Laboratory, University of California; Chapter 5 entitled "Emission Computed Tomography in Image Reconstruction From Projections" edited by G. T. Herman; R. H. Huesman, G. T. Gullberg, W. L. Greenberg, T. F. Budinger: "RECLBL Users Manual—Donner Algorithms for Reconstruction Tomography"; Tech. Rpt. PUB 214, Lawrence Berkeley Laboratory; and the references referred to in those treatises.

As described in the literature, if the attenuation coefficients within the body are assumed to be constant, both convolution algorithms and iterative algorithms can be used to reconstruct the emission image with attenuation compensation. If the attenuation coefficients are assumed to be variable, iterative algorithms can be used. With respect to both applications of iterative algorithms, however, the attenuation coefficients are not used directly, but instead are used to calculate attenuation factors which are subsequently used in the emission reconstruction process. In short, a set of attenuation coefficients $\mu_{ij}$ can be obtained, one for each pixel, by, for example, taking a transmission scan and reconstructing the image as in transmission computed tomography. Those attenuation coefficients are then used to calculate a series of attenuation factors, such as the $A_{ij}{}^{km}$ factors defined in equation 5.104 of the second reference noted above. The $A_{ij}{}^{km}$ factors can be thought of as the attenuation suffered by the radioactivity in pixel $ij$ when ray k of view m is generated. It is seen that those factors are dependent on both the pixel indices ij and the projection indices km; it is therefore appreciated that a rather large number of factors must be calculated and stored prior to beginning the emission reconstruction. Both the computation time and memory requirements for this preliminary calculation are significant. When it is appreciated that nuclear diagnostic imaging is used in part for dynamic studies of body functions, and that such studies require rather rapid production of images as the emitting pharmaceuticals are redistributed, it will be seen that the preliminary computation can present a significant disadvantage.

In view of the foregoing, it is a general aim of the present invention to provide a method and apparatus for iteratively reconstructing emission images corrected for attenuation, while avoiding the need for a preliminary calculation of attenuation factors.

More particularly, it is an object of the present invention to provide a method and apparatus for emission reconstruction which evaluates the attentuation factors as necessary in the actual emission reconstruction process.

A subsidiary object is to provide a projector/back projector for projecting and back projecting emission data in the reconstruction process, which models the attenuation process in the projection and back projection operation.

In that regard, it is a related object to apply the projection and back projection in the context of a least squares approach using iterative techniques to reconstruct the emission concentration while simultaneously compensating for attenuation.

Other objects and advantages will become apparent from the following detailed description when taken in conjunction with the drawings, in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
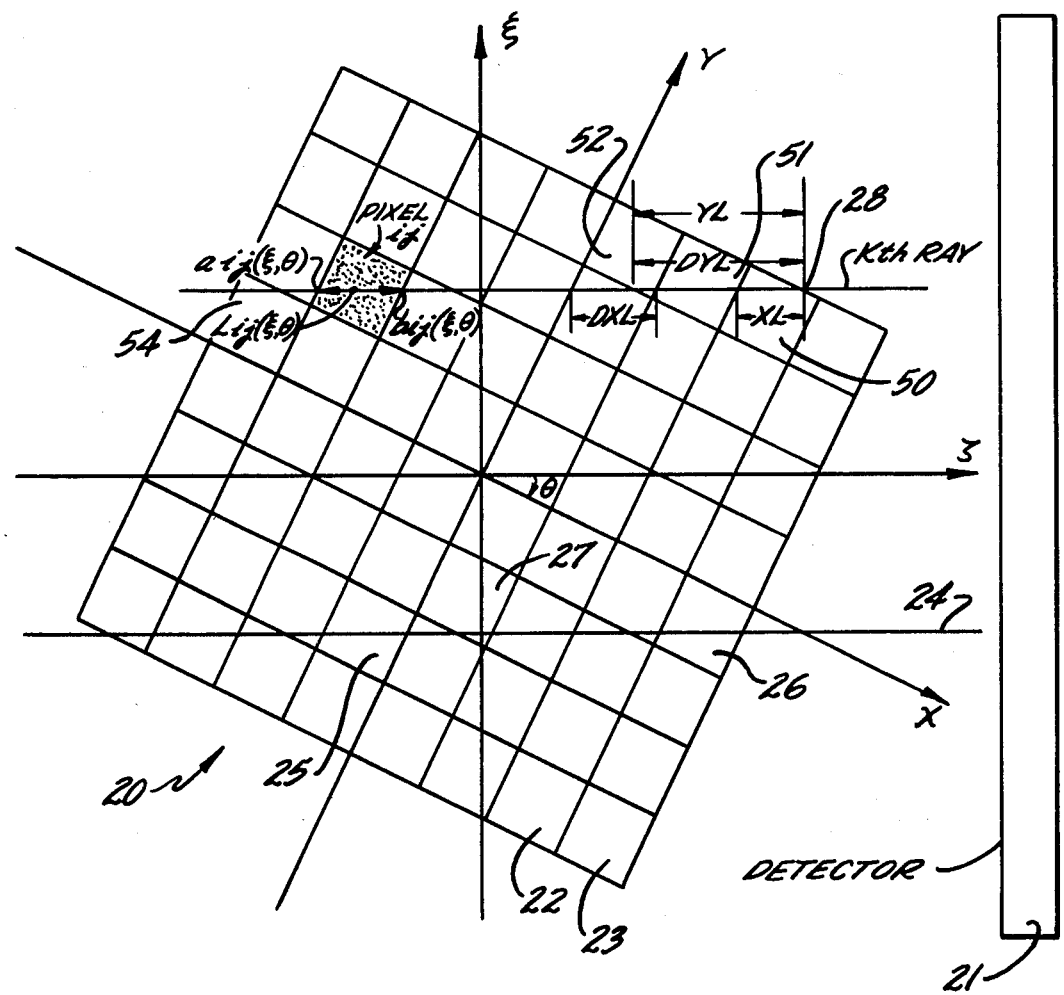
FIG. 1 is a diagram illustrating the geometry of the pixelized reconstruction space, useful in understanding the present invention.

Turning now to the drawings, FIG. 1 illustrates the geometry of the pixelized reconstruction space 20 in which it is desired to reconstruct an image of a body section showing the concentration of radionuclides disposed therein. The pixelized space 20 is comprised of a plurality of pixels 22, 23 into which signals are back projected and from which signals are projected in the iterative reconstruction process. It is understood that in practice, many more pixels will be employed; FIG. 1 has been simplified in order to better illustrate the invention.

As will be appreciated, prior to reconstruction, the body was scanned by a detector or series of detectors indicated generally at 21 to produce a set of projection signals related to attenuated gamma intensities sensed at a plurality of angles around the body. The projections are then combined as will be described below to produce an image, compensated for attenuation, showing the radionuclide distribution in the scanned slice of the body.

The XY axes illustrated in FIG. 1 define the coordinates of the pixelized space; in the reconstructed image the axes will typically be horizontal and vertical respectively. It is seen that those axes are rotated by an angle $\theta$ from the $\xi\zeta$ axes which define the coordinates of the particular projection being considered. Each projection will have its own characteristic angle $\theta$ with respect to the XY axes of the pixelized space.

It will be apparent from FIG. 1 that if the scanned body has attenuating characteristics, the effect of that attenuation on the projections will significantly affect the resulting reconstructions if it is not taken into account. For example, for the view illustrated in FIG. 1, and for the ray 24 a source within pixel 25 will be attenuated much more than a source within pixel 26 before reaching the detector because of the significantly greater length of the body through which the radiation must pass. Further, for the activity in pixel 25 as seen in ray 24, the attenuation of pixel 27 will have much less effect than the attenuation of pixel 26 because of the significantly shorter length of travel of ray 24 through pixel 27. For those reasons, in prior reconstruction techniques which took account of the attenuating characteristics of the body, it was necessary to determine a set of attenuation factors for each pixel and for each angular projection prior to the actual reconstruction operation.

The attenuation characteristics of the body can be determined by known techniques. In some cases, it is permissible to simply determine the outline of the body, then assign a constant attentuation coefficient to each pixel within the body and zero attenuation without. In other cases, a conventional transmission scan (preferably using the same type of gamma source as will be used for the emission scan) can be used to specify or assign attentuation coefficients to each pixel.

In the emission scan, the attenuated source concentration distribution is measured. The source concentration distribution $\rho$ and the attenuation coefficient distribution $\mu$ in the transverse section can be modeled as:

$$\rho(x,y) = \sum_{i,j} \rho_{ij} \chi_{ij}(x,y) \quad (1)$$

$$\mu(x,y) = \sum_{i,j} \mu_{ij} \chi_{ij}(x,y) \quad (2)$$

where $\chi_{ij}$ are characteristic functions which equal 1 if (x,y) is an element of pixel$_{ij}$ and 0 otherwise. The coefficients $\rho_{ij}$ and $\mu_{ij}$ are the average value over the pixel$_{ij}$.

The projection data measured during the course of an emission can be represented by the attenuated Radon transform:

$$(A_\mu \rho)(\xi, \theta) = \int_{-\infty}^{\infty} \rho(\zeta \underline{\theta}^\perp + \xi \underline{\theta}) a(\zeta, \xi, \theta) d\zeta \quad (3)$$

where:

$$\underline{\theta} = (-\sin\theta, \cos\theta), \; \underline{\theta}^\perp = (\cos\theta, \sin\theta),$$

$$a(\zeta, \xi, \theta) = \exp\left\{ -\int_\zeta^\infty \mu(\zeta' \underline{\theta}^\perp = \xi \underline{\theta}) d\zeta' \right\}. \quad (4)$$

The attenuated Radon transform applied to Equation (1) gives:

$$(A_\mu \rho)(\xi, \theta) = \sum_{i,j} \rho_{ij}(A_\mu \chi_{ij})(\xi,\theta). \quad (5)$$

In practicing the invention, we have used Equation (1) and (2) to model the image space, and have modeled the attenuation process in accordance with Equation (5) and Equation (6) which is the transformation of the characteristic functions $\chi_{ij}$:

$$(A_\mu \chi_{ij})(\xi, \theta) = \frac{1}{\mu_{ij}} \{e^{-\mu[b_{ij}(\xi,\theta)]} - e^{-\mu[a_{ij}(\xi,\theta)]}\} \quad (6)$$

Where $\mu[a_{ij}(\xi, \theta)]$ and $\mu[b_{ij}(\xi, \theta)]$ are the line integrals of the attenuation coefficients to the detector from $a_{ij}$ and $b_{ij}$, respectively.

The significance of expression 6 can be appreciated with reference to FIG. 1. For a particular projection at angle $\theta$, there is shown a typical ray, the Kth ray, and its intersections with the pixelized space. The ray intersects a typical pixel$_{ij}$ which has an intensity $\rho_{ij}$ and an attenuation coefficient $\mu_{ij}$ associated therewith. The point of which the Kth ray first intersects pixel$_{ij}$ is denoted as $b_{ij}(\xi,\theta)$. Similarly, the point of which the Kth ray exits pixel$_{ij}$ is denoted as $a_{ij}(\xi, \theta)$. The ray length within pixel$_{ij}$ is denoted as $L_{ij}$. The line integrals of the attenuation coefficients from the entry and exit intersections of the Kth ray with pixel$_{ij}$ are $\mu[b_{ij}(\rho, \theta)]$ and $\mu[a_{ij}(\xi, \theta)]$, respectively. The difference between those line integrals is $\mu_{ij} * L_{ij}(\xi, \theta)$, the contribution to the line integral for pixel$_{ij}$.

In accordance with the invention, we have adapted that relationship to allow piecewise modeling of the attenuation factors of all the pixels along the ray as part of the projection and back projection process for reconstructing the emission image. More particularly, the line integrals of the attenuation coefficients to the respective intersections of the ray with the pixel are built up, beginning with the first pixel intersected by any given ray, and continuing with adjacent pixels, as part of the projection and back protection process. For the projection operation, the relationship can be expressed mathematically as:

$$P(K) = P(K) + (EX1 - EX2) \times \frac{\rho_{ij}}{\mu_{ij}} \quad (7)$$

where $EX1 = e^{-\mu[b_{ij}(\xi, \theta)]}$ and $EX2 = e^{-\mu[a_{ij}(\xi, \theta)]}$. The resulting P(K) is the previous P(K) plus the factors set out in the expression. Similarly, for the back projection operation, the relationship can be expressed as:

$$B(i,j) = B(i,j) + (EX1 - EX2) \times \frac{P(K)}{\mu_{ij}} \quad (8)$$

where the elements of the relationship are as defined above except that B(i,j) is the back projection matrix made up of a map of $\rho$ factors for the pixelized space.

It is seen from the foregoing that the projection and back projection operations are very similar and, unless otherwise indicated herein, the term projection is used to generically characterize both.

Figure 2:
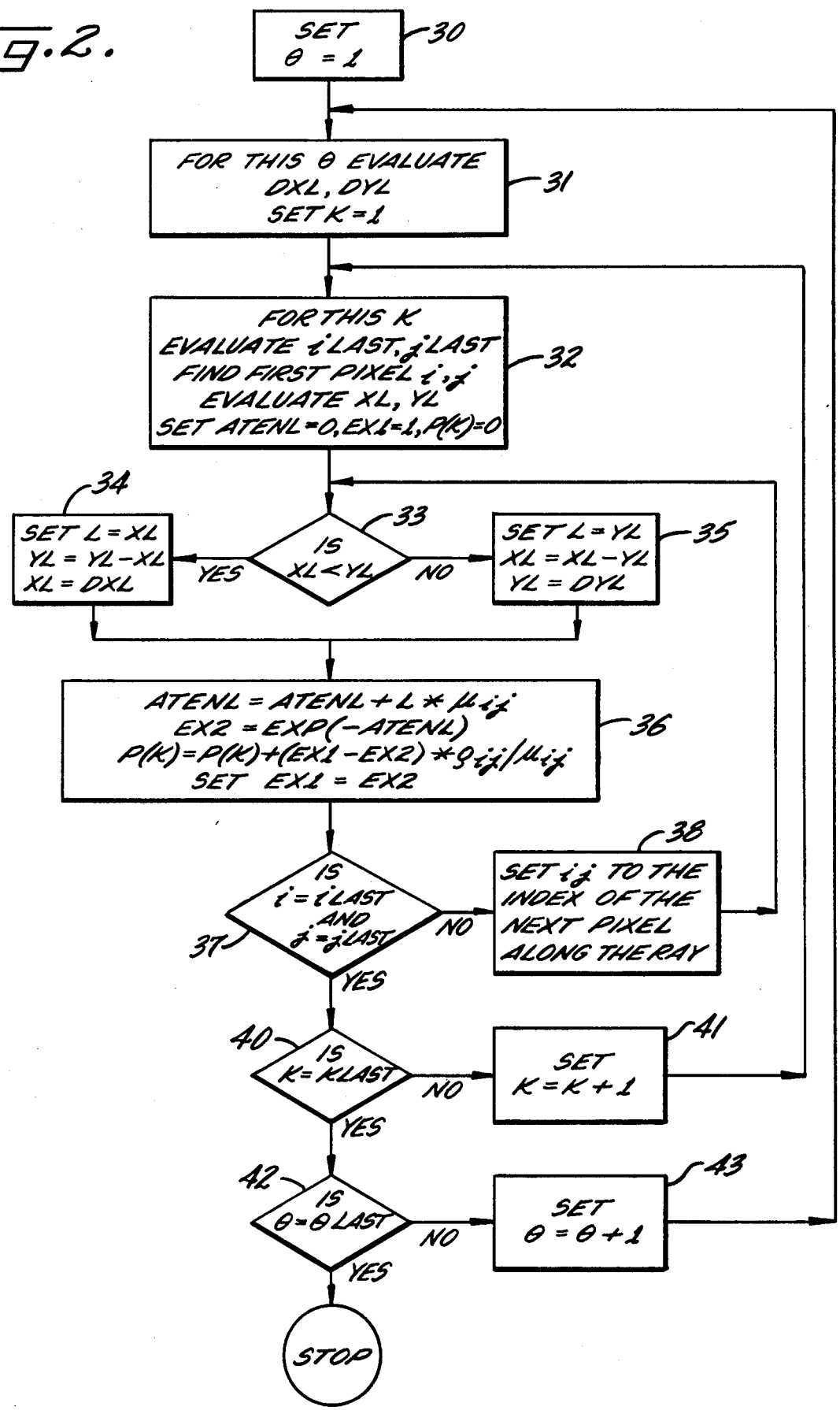
FIG. 2 is a flow chart describing a procedure for modeling the attenuation process during the projection operation in accordance with the present invention.

Turning now to FIG. 2, there is illustrated a procedure by which the attenuation factors are evaluated as needed in connection with the projection or back projection operation. The figure is described in terms of the projection operator but is equally adaptable to the back projection operator simply by using expression 8 instead of expression 7.

The procedure begins with a step 30 which initializes the system to operate on the first projection $\theta = 1$. Further initialization is accomplished in step 31 in which for the selected projection $\theta$, the system evaluates DXL, DYL, and sets K, the ray index, equal to 1. The significance of DXL and DYL can be appreciated with reference to FIG. 1. DXL is the distance between two successive X axis intercepts in the pixelized space. Similarly, DYL is the difference between two successive Y intercepts. Those lengths are illustrated in FIG. 1 for the Kth ray, but it will be appreciated for any given $\theta$ the DXL and DYL factors remain the same for all rays, although they vary with $\theta$. DXL and DYL are fixed by the geometry and are therefore stored constants in memory which are accessed as needed.

The step 32 then initializes conditions for the selected ray in the selected projection. For a particular ray K, the system determines the row and column indices of the first and last pixel intersected by the ray. As in the case of DXL and DYL, that information is determined by the geometry and is stored for ready access when needed. Also stored for ready access are XL and YL for the ray in question. As seen in FIG. 1, XL and YL are the distances from the first intersection 28 of the ray with the pixelized space and the first X and Y intercept, respectively. A series of accumulators is then initialized in step 32. The ATENL accumulator is set to zero in order to begin accumulating information related to the line integrals of the attenuation coefficients for the ray in question. The EX1 accumulator is initialized at 1 since the attenuation prior to entering the pixelized space (at the point 28 of FIG. 1) is zero. Finally, the projection accumulator P(K) is initialized at zero.

Having initialized those conditions, the procedure then determines the length L of the ray in question within the first pixel 50 in order to take account of the attenuation characteristics of that pixel in the modeling process. A test is performed at step 33 to determine whether XL is less than YL. If it is, the process branches to the left to perform a step 34, whereas if it is not the process branches to the right to perform a step 35. For the first pixel 50 illustrated in FIG. 1, it is seen that XL is less than YL, so in this example the process first branches to the step 34. The length factor L is then set equal to XL which as will be appreciated with reference to FIG. 1 is the ray length within the first pixel 50. The XL and YL factors are then redefined in preparation for the next pass through the loop. YL is set equal to YL−XL which, in effect, subtracts from the original distance YL the ray length within the first pixel. XL is set equal to DXL which is the distance between two X intercepts or, in effect, the distance across the next pixel assuming the ray stays within the same row of pixels.

The step 36 is then performed to both determine a partial line integral for the ray through the first pixel 50 and, at the same time, to define a partial projection for that pixel altered by its attenuation characteristics. More particularly, the length L established in step 34 is multiplied by the attenuation coefficient $\mu_{ij}$ attributable to the first pixel 50, and that product is added to the accumulator ATENL. EX2 is then determined by evaluating EXP (−ATENL). A partial projection is then determined dependent on the characteristics of the first pixel by employing the expression:

$$P(K) = P(K) + (EX1 - EX2) \times \frac{P_{ij}}{\mu_{ij}}$$

It will be appreciated that the foregoing expression represents a modeling of the image space in dependence on the projections and in addition takes into account the attenuation of the modeled space. Having determined the partial projection, EX1 is set equal to EX2 in preparation for the next pass through the loop.

A test 37 is then performed to determine whether there are additional pixels in the ray path by determining whether the i and j indices are equal to the last indices established in step 32. Since they are not, the i or j index is incremented at step 38 and the process returns to the test 33. The system then evaluates the length of the Kth ray within the next pixel 51. Since the new XL is still less than the new YL which had been established in step 34, the step 33 will again branch left to the step 34 to set L equal to the length across the pixel 51 and redefine YL and XL for the next pass through the loop. In step 36, the contents of ATENL accumulator will then be increased in dependence upon the length L just determined and the attenuation coefficient $\mu_{ij}$ assigned to the pixel 51. The ATENL accumulator now represents the line integral of the attenuation coefficients for the Kth ray from the point 28 to the exit of the ray from pixel 51. Exponentiating the negative of that number yields EX2, whereas EX1 is the exponentiation of the line integral from the point 28 to the exit of the first pixel 50. Also in step 36 the contents of the projection accumulator are then altered to take account of the line integrals of the attenuation coefficients at the entrance and exit of the pixel 51, the emission coefficient associated with the pixel 51 and the attenuation coefficient associated with the pixel 51. Test 37 and step 38 return the process to the test 33 to again determine whether XL is less than YL.

Referring to FIG. 1, it is seen that the process then determines the length of the Kth ray within the pixel 52. The ray exits the pixel not at an X intercept as in the previous two cases, but at a Y intercept. In that condition, the tests 33 will determine that the previously defined XL is greater than YL, causing a branch to step 35. Thereupon, L is set equal to YL for purposes of computing the attenuation factor associated with the pixel 52. XL is set equal to XL−YL and YL is set equal to DYL in preparation for the next pass through the loop. The process of step 36 is again performed for the new L associated with pixel 52 as well as the attenuation coefficients and emission coefficients associated with that pixel. The process is repeated as described above for each pixel along the Kth ray until the contribution of pixel 54 is added to the projection accumulator, after which the test 37 determines that the last pixel for the given ray has been processed. A test 40 then determines that the Kth ray is not the last ray whereupon a step 41 is accomplished to increment the ray index, following which the entire process is repeated for the new ray. After all rays for a given projection have been processed, a test 42 determines that there are additional projections to be processed, whereupon a step 43 increments $\theta$, and the entire procedure beginning with step 31 is repeated for the new projection. After the last projection has been processed, the test 42 produces a positive result, whereupon the projection operation is terminated. The projection operator within the step 36 can then be altered to the back projection operator set out in Equation (8) and the process repeated for a back projection operation. The process alternates between the projection and back projection operations for a predetermined number of iterations to create a model which is a best least squares fit to the projection data. The information within the model is then displayed as on a CRT to produce an emission image corrected for attenuation.

The specific details of the application of the projection or back projection algorithm used for the emission reconstruction were not discussed in detail above. Generally, the iterative methods adjust the parameters (the reconstructed pixel values) such that when the reconstructed values are projected, the resulting projections are as close as possible to the measured signals, generally in a least squares sense. The present invention is useful in connection with a number of different reconstruction algorithms, as will be pointed out briefly below.

Simultaneous iterative reconstruction techniques (SIRT) use information from all the projections to determine a new solution in the iterative process. These types of algorithms include the gradient, conjugate gradient, and iterative convolution methods. The gradient and conjugate gradient methods require the backprojection process to be the transpose of the projection process as given in expression 8. The iterative convolution approach would require a different backprojection operation which one can derive from equation 8 by setting $\mu_{ij}=0$:

$$B(i,j) = B(i,j) + L_{ij}P(k)$$

where $L_{ij}$ is the line length through the pixel$_{ij}$ for the ray K. The nature of the necessary changes in the processor to implement the foregoing expresssion will be apparent to those experienced in this art.

The SIRT algorithms can project and back project various types of information based on the requirements of the particular algorithm being employed. For example, in the back projection process the measured projection signals or the difference between the measured projection signals and assumed projection signals can be back projected. In the projection process, among the signals which can be projected are the results of the immediately preceeding back projection operation or the difference between the results of the previous back projection operation and an assumed image space distribution.

ART (algebraic reconstruction techniques) to which the invention can also be applied use the measurements for one or a small number of rays to update all the pixels at each iterative step. This means that the hardware described herein would require one or a small number of ray calculations before updating the new solution for the reconstructed image. These iterative algorithms are designed to give a reconstructed image either which is a maximum likehood estimate for the measured projections or which maximizes entropy subject to the constraints of the measured data and smoothing criteria.

It will now be recognized that the attenuation compensation procedure described above does not significantly extend the processing time for any given reconstruction algorithm. The evaluation of the length factors is accomplished by simple additions and comparisons which can be performed very rapidly. The multiplication and division requirements of step 36 can also be rapidly performed, particularly in a hardware floating point processor of the pipeline variety, or in some cases by means of table lookup. Thus, using the present procedure, it is possible to to evaluate the attenuation factors during the actual reconstruction operation, rather than in a preliminary step as has been done in the past.

Figure 3:
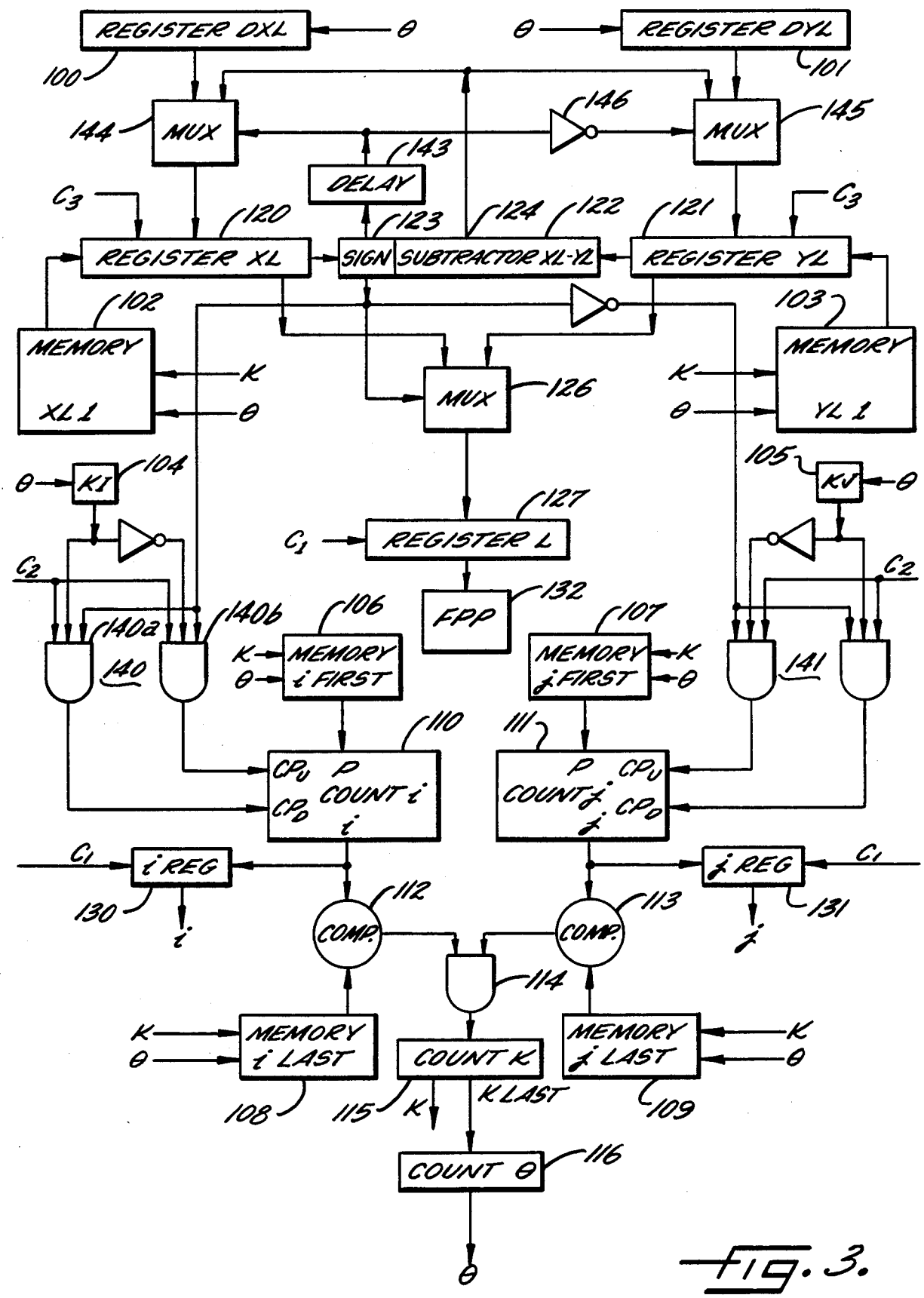
FIG. 3 is a block diagram showing a circuit configuration for a projector exemplifying the present invention.

Turning now to FIG. 3, there is shown in block diagram form the general configuration of a hardware processor for performing the procedures described in connection with FIGS. 1 and 2. Looking first to the elements which are initialized prior to processing a projection, a pair of registers 100, 101 are preset with the values of DXL and DYL for a given projection. It is seen that the selector signal for the registers 100, 101 is a function of $\theta$ and thus, at the start of processing a given projection, the registers are loaded with the characteristic lengths for that $\theta$.

A pair of memories 102, 103 are arranged to store the length through the first pixel for each projection and for each ray in the projection. It is seen that the memories 102, 103 are addressed by both K and $\theta$ signals to read out the particular XL1 and YL1 respectively associated with the ray and view being processed. A pair of one bit registers 104, 105 are also initialized to control the incrementing and decrementing of the row and column indices, respectively. It will be appreciated that the pixelized space is operated on for purposes of projection and back projection from all angles and thus the pixel indices may require incrementation or decrementation depending on the orientation of a view with respect to the projection space. The registers 104, 105 control incrementing or decrementing in dependence upon $\theta$ signals defining the particular projection.

Finally, it is recalled that it is necessary to evaluate the row and column indices for the first and last pixel associated with any given ray in a given view. Accordingly, first memory registers 106, 107 and last memory registers 108, 109 are preset by the K and $\theta$ signals then in effect. The first memory registers 106, 107 serve to preset a pair of index counters 110, 111 whereas the last memory registers 108, 109 are coupled to a pair of comparators 112, 113 which serve to produce an output signal when the last indices are reached. When both comparators produce such output signals, indicating the last pixel has been processed for the ray in question, an AND gate 114 is activated to increment a K counter 115. The K counter produces K signals which address the presetting elements discussed above. In addition, the K counter produces a K last signal which increments a projection counter 116 which in turn produces $\theta$ signals for addressing the presetting elements discussed above.

Before discussing the remaining circuitry of FIG. 3, it will be recalled from FIG. 2 that certain of the process steps must be performed in a defined sequence. In the hardware embodiment of FIG. 3, the sequence is controlled by a digital clock comprising an oscillator and associated frequency dividers. While those elements are not illustrated in FIG. 3, clock inputs are shown for various of the elements and labeled with designator $C_1$, $C_2$, $C_3$ or $C_4$. That notation is intended to signify a four-phase clock where four clocking signals are produced in sequence beginning with $C_1$ and ending with $C_4$. The implementation of such a clock will be apparent to those skilled in the art based upon the requirements set out herein.

Referring again to FIG. 3, there is provided an XL register and a YL register 120, 121 which are updated in accordance with the procedures set out in steps 34 and 35 of FIG. 2. Upon initialization, the memories 102, 103 are caused to load the first XL and YL into the registers 120, 121, respectively. Those magnitudes are applied to a subtractor 12 which determines the difference XL−YL. The subtractor has a plurality of magnitude bits indicated generally at 124 and a sign bit 123. The sign bit is used to control branching left or right based on the decision 33 of FIG. 2. If the result of the subtraction is positive indicating that XL is greater than or equal to YL, the sign bit is set to 0, whereas if the result is negative, indicating that XL is less than YL, the sign bit is set to 1.

In the example discussed above, for the first pixel of the Kth ray, the result is negative and the sign bit is 1. The logic 1 is applied to a multiplexer 126 having a pair of multi-bit inputs fed from the XL and YL registers, respectively. With the sign bit at logic 1, the XL input is passed to the multiplexer output and presented to an L register 127. In the first phase of the clock signal, the register L is clocked to receive the output from multiplexer 126, in this case, the value of XL. It is also convenient at this time to clock a pair of i and j registers 130, 131 to capture the i and j indices for use in later processing.

Figure 4:
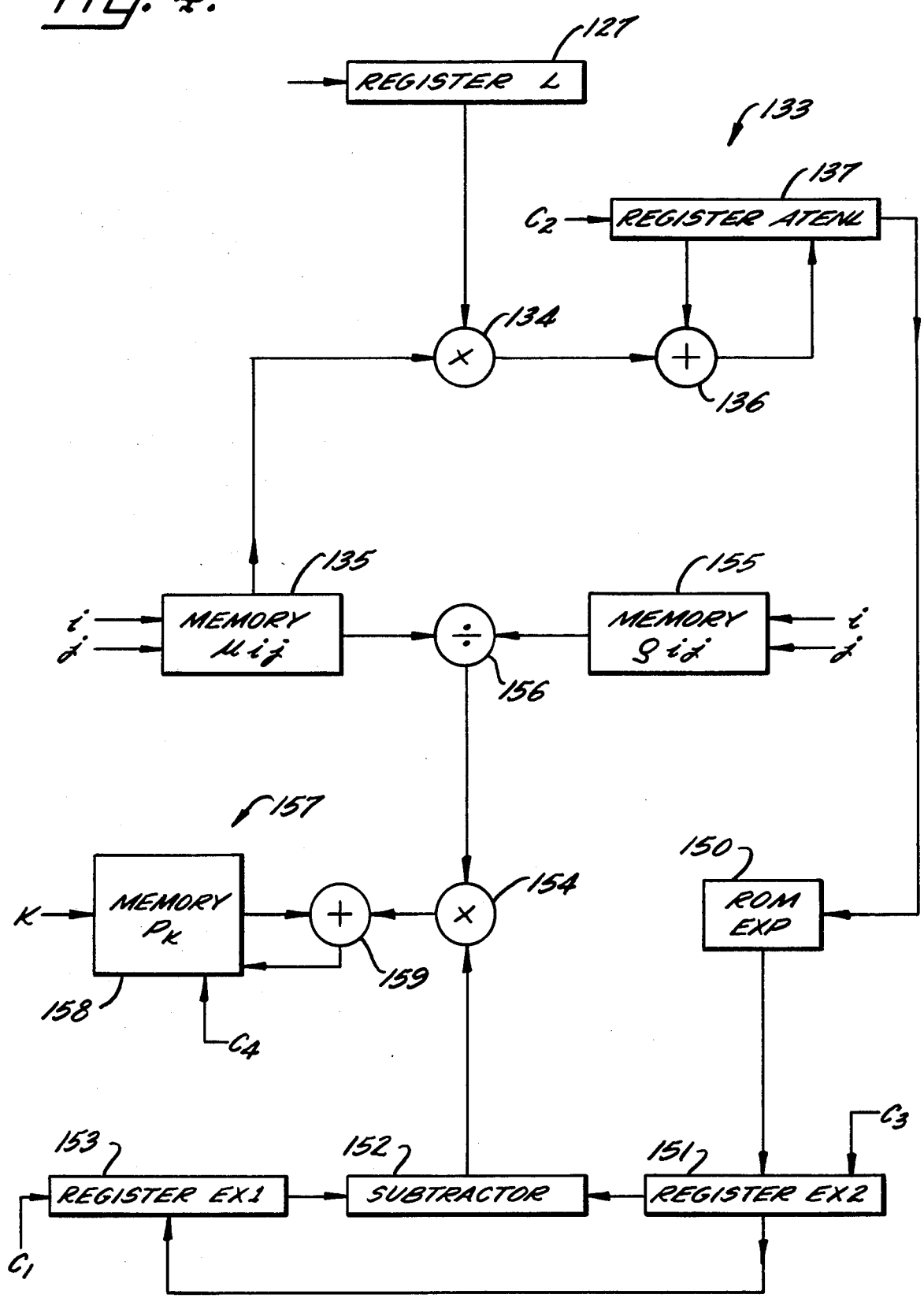
FIG. 4 is a block diagram showing a processor used in the projector of FIG. 3.

The contents of the L register 127 are passed to a floating point processor 132 illustrated in greater detail in FIG. 4. In the floating point processor, the contents of the register L are presented to a multiplier 134 along with the attenuation coefficient read out of a memory 135 by the i and j indices stored in registers 130, 131. Thus, the L value is multiplied by the attenuation coefficient for the pixel in question, and the product is passed to an accumulator 133 comprised of an ATENL register 137 and adder 136. In the second phase of the clock signal $C_2$, the contents of the ATENL register are added to the product from multiplier 134 and the sum is stored in the register 137. It is also convenient at this time to clock the i or j index counters 110, 111.

It will be appreciated from FIG. 1 that usually only one of such indices are incremented (or decremented) at any given time because the ray usually passes from row to row or column to column but not both. The particular index which is incremented is controlled by the sign bit 123. It is seen that the sign bit is passed to a pair of logic arrays 140, 141 which in turn are coupled to the up and down clocks of the counters 110, 111. With the sign bit being at 1, indicating a negative subtraction result, the array 140 is enabled to clock the counter 110. The logic high or low within the KI register 104 controls whether the gate 140a or 140b will decrement or increment the counter, and the bit within the register 104 is set in dependence on whether the ray is intersecting the pixels from high index to low or low index to high.

During the third phase of the clock signal $C_3$, the registers 120, 121 are updated for a subsequent pass through the loop. It is seen that the sign bit 123 is coupled through a delay element 143 to the control inputs of a pair of multiplexers 144, 145. The multi-bit inputs to the multiplexer 144 are derived from the DXL register 100 and the magnitude bits of the subtractor 122. Similarly, the multi-bit inputs to the multiplexer 145 are derived from the DYL register 101 and the magnitude bits of the subtractor 122. The multiplexers are controlled to respond in opposite fashion by virtue of the sign bit being coupled directly to the multiplexer 144 and through an inverter 146 to the multiplexer 145. The delay element 143 assures that the multiplexers 144, 145 are controlled in dependence on the sign bit existing in the subtractor 122 at the start of the operation rather than a possible transient created as the registers XL, YL are loaded with new information. For the assumed conditions with the sign bit being at logic 1, the information from DXL register 100 is passed to register XL, while the information from the subtractor, which is the magnitude of YL−XL is passed through the multiplexer 145 to the input of the YL register. In the third phase of the clock, that information is loaded into the respective registers in preparation for the next pass through the loop.

Returning to FIG. 4, and recalling that in the first phase of the clock signal the ATENL register 137 was updated based on the new pixel, the output of that register is passed to a read only memory 150 which by means of table lookup generates an output signal equal to the result of evaluating the exponential function of the negative of the value within the ATENL register. In the third phase of the clock signal, that information is loaded into EX2 register 151. A subtractor 152 coupled between the EX2 register 151 and an EX1 register 153 determines the difference between those two factors. It is recalled that the EX1 register was initialized at 1 by the step 32 of FIG. 2. A multiplier 154 has presented thereto the difference EX1−EX2 along with the quotient $$\frac{\rho_{ij}}{\mu_{ij}}$$

derived from the memory 135, a memory 155 and a divider 156. In the fourth phase of the clock signal, a projection accumulator generally indicted at 157 adds the previous contents of the projection memory 158 to the output of multiplier 154 by way of adder 159 and stores the result. It will therefore be appreciated that the projection accumulator 157 accumulates partial projections as the pixels are processed in turn just as the ATENL accumulator 133 accumulates partial line integrals of the attenuation coefficients.

Returning again to the first phase of the clock signal, the EX1 register 153 is clocked to accept the contents of EX2 register 151 in preparation for processing the next pixel. The new values of XL and YL (from the third clock cycle) are present in the registers 120, 121 and in the example described above again generate a negative result producing a high sign bit. The process is repeated as described above, loading the contents of register XL through multiplexer 126 into the L register 127, and loading the new i and j indices into registers 130, 131.

In the second phase of the clock signal, the ATENL accumulator 133 is cycled to add in the product of the new L times the new $\mu_{ij}$ read out of the memory 135 under the control of registers 130, 131. In addition, the i counter is incremented as described above in preparation for the next cycle. In the third phase of the clock signal, the DXL information is read through multiplexer 144 into XL register 120 and the result of the subtraction read through multiplexer 145 into YL register 121. In addition, the floating point processor exponentiates the negative of the ATENL factor and loads the information into EX2 register 151. Finally, in the fourth phase of the clock cycle, the elements described above adjust the projection value within the projection accumulator 157.

In the example described above, for the third pixel 52 (FIG. 1) the subtractor produces a positive result in which the sign bit is 0. In that condition, in the first phase of the clock signal, the multiplexer 126 is switched to load the contents of YL register 121 into L register 127. Just as in the other cycles, the i and j registers 130, 131 are loaded with a new index and the previous contents of EX2 register 151 loaded into EX1 register 153. On the second phase of the clock signal, since the sign bit is now zero, the array 141 will be activated to increment (or decrement) the j counter 111. As in the case of the previous cycles, the ATENL accumulator will be updated with information from the new pixel. In the third phase of the clock, the multiplexers 144, 145 will work in opposite fashion to load the information from DYL register 101 into the YL register 121 and the result of the subtraction process from the subtractor 122 into the XL register 120. In the same fashion as discussed previously, the magnitude within the ATENL register 137 is used to address the ROM 150 to produce the new EX2 signal to be loaded into register 151. Finally on the fourth phase of the clock signal, the projection accumulator 157 is again updated.

That cycle continues until the comparators 112, 113 determine that the last pixel for the given ray has been processed at which point the AND gate 114 is satisfied to increment the ray counter 115. New K signals readdress the memories 102, 103, etc. to load initial values into the XL and YL registers, and to set up the first and last pixel indices in the memories 106–109. The process is repeated for all rays for the given view, then the view is incremented and the entire operation repeated until all views have been processed.

The hardware implementation of FIGS. 3 and 4 has been described in connection with the projection operation. It will be appreciated that the same hardware can also be used in the back projection operation. To accomplish that, it is simply a matter of interchanging the functions of the projection memory 158 and the image memory 155. That can be accomplished by a memory swap operation or by locating multiplexers at the points X, Y and Z, the inputs and outputs of the projection and image memories of FIG. 4.

Expressions 7 and 8 define the projection and back projection for most circumstances. In the special case where $\mu_{ij}=0$, those expressions reduce to:

$$P(K)=P(K)+L_{ij}*EX1*p_{ij} \quad (7')$$

and $$B(i,j)=B(i,j)+L_{ij}*EX1*P(K) \quad (8')$$

The hardware processor disclosed herein assumes $\mu_{ij}$ is greater than zero. However, the alterations in the hardware required to test for $\mu_{ij}=0$ and branch to there alternative expressions can be easily implemented by those skilled in this art.

As noted above, the projection and back projection operations can continue for as many iterations as desired in order to obtain a best fit of the projections to the data. Attenuation is accounted for at each step of the operation without the need for laboriously computing a large array of attenuation factors before beginning the reconstruction, while the method of evaluating attention factors from attenuation coefficients as needed (as the ray intersects the pixel of interest) efficiently accomplishes the evaluation without substantially slowing the process.

We claim as our invention:

1. A method of reconstructing emission projection signals to produce a pixelized image of distributed emission sources in an attenuating medium, said method comprising the steps of specifying a set of attenuation coefficients for the pixelized space, collecting a set of measured emission projection signals, back projecting signals related to the measured emission projection signals to produce an image space estimate related to the emission distribution in the pixelized space, projecting the image space estimate wherein the step of projecting uses attenuation factors which are derived from the attenuation coefficients of the pixelized space during the projecting step, and repeating the back projecting and projecting steps after substituting for the signals being back projected the results of the previous projecting step to produce a pixelized image of distributed emission sources compensated at least in part for the attenuation of the attenuating medium.

2. The method as set out in claim 1 wherein the step of specifying a set of attenuation coefficients includes performing a transmission scan and reconstructing the attenuation coefficients from the transmission scan.

3. The method as set out in claim 1 in which the step of specifying a set of attentuation coefficients includes assigning a set of assumed attenuation coefficients to the pixelized space.

4. The method as set out in claim 1 wherein the first back projection step includes back projecting the measured emission projection signals.

5. The method as set out in claim 1 wherein the first back projection step includes back projecting the difference between the measured emission projection signals and a set of assumed projection signals.

6. The method as set out in claim 1 wherein the first projection step includes projecting the results of the first back projection step.

7. The method as set out in claim 1 wherein the first projection step includes projecting the difference between the results of the first back projection step and an assumed image space distribution.

8. A method of reconstructing emission projection signals to produce a pixelized image of distributed emission sources in an attenuating medium, said method comprising the steps of
    (a) specifying a set of attenuation coefficients relating to the respective pixels in the image space,
    (b) collecting a set of emission projection signals,
    (c) for a projection along a particular ray determining the attenuation factor from the attenuation coefficient for a first pixel intersected by the ray,
    (d) establishing a partial projection based on the projection signals and the attenuation factor determined in step (c),
    (e) iterating steps (c) and (d) along the ray to complete the projection corrected for attenuation of the pixels through which the ray passed,
    (f) repeating steps (c), (d) and (e) for the rays associated with the remaining set of projection signals, and
    (g) alternately and iteratively projecting and back projecting in accordance with steps (c), (d) and (e) to produce an emission image corrected at least in part for attenuation.

9. A method of reconstructing emission projection signals to produce a pixelized image of distributed emission sources in an attenuating medium, said method comprising the steps of (a) specifying a set of attenuation coefficients relating to the respective pixels in the image space,
(b) collecting a set of emission projection signals,
(c) for a given ray determining the ray length across the first pixel intersected by the ray,
(d) applying the attenuation coefficient for said pixel to the determined ray length to produce a partial line integral of attenuation coefficients for the ray,
(e) forming a partial projection using said line integral and signals related to the projection signals for the ray,
(f) repeating steps (c), (d) and (e) for each succeeding pixel intersected by the ray,
(g) repeating steps (c)-(f) for all rays and all projections to produce an emission map compensated for attenuation, and
(h) displaying the result of step (g).

10. An image reconstructor for producing a pixelized image of emission sources in an attenuating medium, said reconstructor comprising in combination, attenuation coefficient memory means for storing a set of attenuation coefficients related to the pixels in the image space, projection memory means for storing a set of projection signals related to lines of pixels in the image space intersected by respective rays, image memory means for storing values for the pixels in the pixelized space, a projector/back projector for sequentially accumulating sums, first means for coupling signals from the projection memory to the projector/back projector for back projecting signals to the image memory in a back projection operation, second means for coupling signals from the attentuation coefficient memory and the image memory to the projector/back projector for projecting signals to the projection memory in a projection operation, and means for sequentially enabling the first means and second means for iterative back projection and projection to produce an emission image corrected at least in part for attenuation.

* * * * *

UNITED STATES PATENT AND TRADEMARK OFFICE
CERTIFICATE OF CORRECTION

PATENT NO. : 4,633,398
DATED : December 30, 1986
INVENTOR(S) : Grant T. Gullberg and Norbert J. Pelc It is certified that error appears in the above-identified patent and that said Letters Patent is hereby corrected as shown below:

Column 3, line 64, change "=", second occurrence, to -- + --.

Column 4, line 28, change "(p,θ)" to -- ($\xi$,θ) --

Column 9, line 5, change "12" to -- 122 --.

Signed and Sealed this

Thirty-first Day of March, 1987

Attest:

DONALD J. QUIGG

Attesting Officer     Commissioner of Patents and Trademarks